US008694405B2

(12) United States Patent
Parga Landa (10) Patent No.: US 8,694,405 B2
(45) Date of Patent: Apr. 8, 2014

(54) SYSTEM AND METHOD OF VISUAL REPRESENTATION OF STOCK EXCHANGE TRANSACTIONS

(75) Inventor: José Antonio Parga Landa, Madrid (ES)

(73) Assignee: Visual Trader Systems, S.L., Madrid (ES)

( * ) Notice: Subject to any disclaimer, the term of this patent is extended or adjusted under 35 U.S.C. 154(b) by 693 days.

(21) Appl. No.: 12/656,234

(22) Filed: Jan. 21, 2010

(65) Prior Publication Data

US 2011/0178950 A1 Jul. 21, 2011

(51) Int. Cl.
*G06Q 40/00* (2012.01)

(52) U.S. Cl.
USPC ..................................... 705/36 R; 705/35

(58) Field of Classification Search
USPC ................................................ 705/36 R, 35
See application file for complete search history.

(56) References Cited

U.S. PATENT DOCUMENTS

| | | | | |
|---|---|---|---|---|
| 7,830,383 | B1* | 11/2010 | Perttunen | 345/440 |
| 7,928,982 | B1* | 4/2011 | Perttunen | 345/440 |
| 7,990,383 | B1* | 8/2011 | Perttunen | 345/440 |
| 2002/0178096 | A1* | 11/2002 | Marshall | 705/35 |
| 2003/0009411 | A1* | 1/2003 | Ram et al. | 705/37 |
| 2003/0065608 | A1* | 4/2003 | Cutler | 705/37 |
| 2003/0069834 | A1* | 4/2003 | Cutler | 705/37 |
| 2005/0075965 | A1* | 4/2005 | Cutler | 705/37 |
| 2005/0075966 | A1* | 4/2005 | Duka | 705/37 |
| 2005/0228735 | A1* | 10/2005 | Duquette | 705/37 |
| 2005/0246263 | A1* | 11/2005 | Ogg et al. | 705/37 |
| 2007/0038543 | A1* | 2/2007 | Weinstein | 705/36 R |
| 2007/0118454 | A1* | 5/2007 | Bauerschmidt et al. | 705/36 R |
| 2007/0244783 | A1* | 10/2007 | Wright et al. | 705/35 |
| 2008/0065510 | A1* | 3/2008 | Yu | 705/27 |
| 2008/0183639 | A1* | 7/2008 | DiSalvo | 705/36 R |
| 2010/0268637 | A1* | 10/2010 | Burns et al. | 705/37 |
| 2011/0087581 | A1* | 4/2011 | Ram et al. | 705/37 |
| 2011/0264579 | A1* | 10/2011 | Kline et al. | 705/37 |
| 2011/0270729 | A1* | 11/2011 | Kline et al. | 705/35 |

\* cited by examiner

*Primary Examiner* — Bruce I Ebersman
*Assistant Examiner* — Kevin Poe
(74) *Attorney, Agent, or Firm* — Wenderoth, Lind & Ponack, L.L.P.

(57) ABSTRACT

System and method of visual representation of stock exchange transactions which provide additional information for traders when it comes to taking buy/sell decisions for stocks, being oriented towards electronic stock exchange transactions. Specifically, the present invention is aimed at tools for trading of products that can be traded in terms of quantities and/or prices. The method is based on labeling each transaction with a label selected from between initiated buy transaction, when the execution price is equal to or greater than the sell limit price registered in the first sell level of the order book, and initiated sell transaction, when the execution price is equal to or lower than the buy limit price registered in the first buy level of the order book.

9 Claims, 7 Drawing Sheets
(5 of 7 Drawing Sheet(s) Filed in Color)

SYSTEM AND METHOD OF VISUAL REPRESENTATION OF STOCK EXCHANGE TRANSACTIONS

FIELD OF INVENTION

As stated in the title of this descriptive specification, this invention relates to a system and method of visual representation of stock exchange transactions which provide additional information for traders when it comes to taking buy/sell decisions for stocks, being oriented towards electronic stock exchange transactions. Specifically, the present invention is aimed at tools for trading of products that can be traded in terms of quantities and/or prices.

BACKGROUND

Within technical analysis of stock exchanges, there exist and can be found in electronic tools for trading, in the specialized bibliography or in the network in general a multitude of mathematical indicators that can be represented graphically. At the stock exchange level, graphic representation acquires a key importance; it is not for nothing that the trading now carried out by an operator is backed up almost exclusively by graphs.

In spite of the wide variety of indicators and oscillators existing in the state of the art, they are all constructed on the basis of at most two gross variables of the market: price and volume. These indicators are based on the analysis of those variables by means of different alternatives which could be the stock price at the beginning and close of the session, the evolution of that stock over the course of the session, etc.

We can find an example of stock exchange analysis in the state of the art in the Accumulation/Distribution (A/D) line conceived by Marc Chaikin in order to deal with capturing the flow of money into and out of a stock as a prediction of the variation in the price.

For each period of fixed duration (5 min., 1 hour, 1 day, etc.) into which time is divided, Chaikin calculates the maximum, minimum and closing price. The relative position of the close with respect to the range formed by the maximum and minimum takes on a value of between 1 (close=maximum) and −1 (close=minimum) known as CLV ("Close Location Value"). If it is positive, the close is nearer to the maximum, it is considered that buys "beat" sells and the volume of the period contributes positively to the A/D line (buyer pressure). If it is negative, then it is nearer to the minimum and the volume contributes negatively (seller pressure). The A/D line is an accumulated series of "buyer" (positive) and "seller" (negative) volumes obtained by multiplying the accumulated series of volumes by the CLV series. There exists a variant of this oscillator (known simply as the Chaikin oscillator) which applies a MACD (Moving Average Convergence Divergence) to the A/D line. The aim of the MACD is to predict the variation of the series on which it is being applied, in this case that of A/D.

Another similar oscillator in the state of the art though predating that of Chaikin (Joe Granville 1963) is the OBV (On Balance Volume). It too uses the relative position of the close of the period but with respect to the close of the previous period. Once the oscillator has been constructed, it is used for obtaining buy or sell signals on the stock. A positive divergence between the stock and the oscillator, in other words, the oscillator has a positive tendency and price of the share a negative tendency, produces a buy signal.

Indeed, Chaikin type oscillators and others determine whether a contracted volume contributes to the buyer or seller pressure as a function of the evolution which the price has had. Nevertheless, they do not in any real way calculate the buyer or seller pressures in the market and they do not use a variable that would represent whether the transaction carried out has been initiated by a buy or a sell. They simply obtain an estimate affected by the variation, usually erratic, of the series of prices.

It would therefore be desirable to find a system and method of analysis and representation of the evolution of stocks that would clearly, concisely and directly represent the values associated with a transaction where the buyer and seller pressures especially are sampled.

DETAILED DESCRIPTION

In order to achieve the objectives and avoid the drawbacks stated above, the present invention incorporates into stock exchange analysis information that is not to be found in the charts. Variables such as the "side" on which each stock exchange transaction (buy/sell) starts, the type of order, or the market depth can be common when it comes to placing orders in the market, but this is not the case when dealing with, storing and analyzing the data that this generates.

Having this information requires specific generation and processing of the database. Later on, its combination and representation are equally decisive in the success of providing the trading with the market pulse and transmitting to the operator the essential information of it in order to help him take the right decisions.

The present invention comprises a novel method of analysis and representation based on four types of indicators:
Buyer/seller pressure,
Market depth,
Gradients of volume,
Trading profile.

The novel method of visual representation of stock exchange transactions for at least one registered stock in terms of price levels in a price limit order book, where each transaction is defined by a transaction information associated with said transaction, comprises at least:
a date and time;
a negotiation market;
a negotiated stock;
an execution volume;
a sell limit price registered in the first sell level of the order book;
a buy limit price registered in the first buy level of the order book;
an execution price;
wherein the method comprises for each stock exchange transaction:
receiving in real time at least one transaction and its associated transaction information;
labeling the at least one transaction with a label selected from between initiated buy transaction, when the execution price is equal to or greater than the sell limit price registered in the first sell level of the order book, and initiated sell transaction, when the execution price is equal to or lower than the buy limit price registered in the first buy level of the order book;
determining the value in real time of a binary variable known as "side" which takes the value "1" when the transaction information is an initiated buy transaction, in other words, which is produced on the side of the sell positions (ASK) of the order book, and takes the value "2" when the transaction information is an initiated sell transaction, in other words, which is produced on the side of the buy positions (BID) of the order book;

depicting in real time, on a user graphic interface, the transaction information selected between the initiated sell transaction information, the initiated buy transaction information and a combination of both by means of at least two colors determined by the "side" binary variable;

adding a color for depicting in real time, on the user graphic interface, the evolution in time of the buy limit price in the first buy level and of the sell limit price in the first sell level;

calculating for each minimum representation time period "t", a buy volume executed against the sell orders of the book (ASK), $VA_t$, whose value corresponds to the sum of the executed volumes of initiated buy transactions whose date and time lie within the minimum representation time period "t", and an executed sell volume against buy orders of the book (BID), $VB_t$, whose value corresponds to the sum of the executed volumes of initiated sell transactions whose date and time lie within the minimum representation time period "t";

calculating a real Bid/Ask pressure for the minimum representation time "t":

$$PR_t = VA_t - VB_t;$$

depicting in real time, on said use graphic interface, the evolution in time of the real Bid/Ask pressure, said pressure being represented between the representation made for the time evolution of the buy limit price in the first buy level and the sell limit price in the first sell level, with the color determined by the value "1" of the side variable if $PR_t$ is greater than zero and its intensity being proportional to the absolute value of $PR_t$, and by the value "2" of the side variable if $PR_t$ is less than zero and its intensity being proportional to the absolute value of $PR_t$; adding a color when the value of $PR_t$ is equal to zero.

Additionally, the method of the present invention considers, both whether just the buy limit price in the first buy level and the sell limit price in the first sell level are depicted, and whether in addition the real Bid/Ask pressure is represented, the possibility of depicting in real time, on that user graphic interface, the evolution in time of the volume of each buy and sell level of the price limit order book, the buy volumes below the first buy level in the price axis being represented in the color determined for buys, and the sell volumes above the first sell level in the price axis being represented in the color determined for sells.

Moreover, the novel method of the present invention also permits calculating the buyer/seller pressure by means of calculating the accumulated by price real Bid/Ask pressure and the ratio between the executed buy volume at price level p $VA_t(P)$, and the executed sell volume at price level p $VB_t(p)$. For this, the method of the present invention additionally includes:

calculating, in real time, the accumulated by price real Bid/Ask pressure $PRA_t$:

$$PRA_t(p) = \alpha \cdot PRA_{t-1}(p) + VA_t(p) - VB_t(p);$$

where $PRA_{t-1}(p)$ represents the accumulated by price real Bid/Ask pressure in the minimum representation period t−1, and a is a coefficient between 0 and 1 weighting the importance of period t−1 for the calculus of period t;

depicting in real time, on said use graphic interface, the evolution in time of the accumulated by price real Bid/Ask pressure, said pressure being represented at each price level the stock price passes through, with the color determined for buys if $PRA_t$ is greater than zero, its intensity being proportional to the absolute value of $PRA_t$, and with the color determined for sells if $PRA_t$ is less than zero, its intensity being proportional to the absolute value of $PRA_t$; adding a color when the value of $PRA_t$ is equal to zero;

depicting in real time, on said user graphic interface, the evolution in time of some moving averages of the values $VA_t$ y $VB_t$ on the basis of some weightable values (length in number of time periods of the moving window) selected by the user.

calculating the volume imbalance between the first sell level of the order book (ASK) and the first buy level of the order book in order to determine the immediate evolution in the stock price by means of a ratio:

$$\text{Ratio} = \log \frac{V_t^{ASK}}{V_t^{BID}}$$

where $V_t^{ASK}$ is the volume of the first sell level for the period t, and $V_t^{BID}$ is the volume of the first buy level for the period t.

The novel method of the present invention furthermore permits analysis of the market depth by means of calculating normalized volumes and volume gradients, permitting the "ceilings" and "supports" of the stock to be identified at any instant of representation up to the time period t. For this, the method of the present invention additionally comprises:

normalizing the volume of each registered level in the order book by means of:

$$Vn_t^i = N \cdot \frac{V_t^i}{\sum_{j=0}^{N-1} \sum_{k=1}^{K} V_{t-j}^K};$$

where $V_t^i$ is the volume of level i in the time period t, "K" is the total number of levels, "N" is the number of time periods passed taken into account for the normalization (preferably several days, e.g. 30 days), $Vn_t^i$ is the normalized volume of level i in the time period t;

depicting in real time, on said user graphic interface, the evolution in time of the normalized volumes of the order book, with the normalized buy volumes below the first buy level on the price axis being represented in the color determined for buys and its intensities being proportional to the value of the normalized buy volumes, and the normalized sell volumes above the first sell level on the price axis being represented in the color determined for sells and its intensities being proportional to the value of the normalized sell volumes;

calculating a gradient for each normalized volume of the price limit order book by means of:

$$\nabla V_t^i = Vn_t^i - Vn_{t-1}^i$$

where $\nabla V_t^i$ is the gradient of level i for the period t, and $Vn_t^i$ and $Vn_{t-1}^i$ represent the normalized volume of level i for the time period t and t−1 respectively;

depicting in real time, on said user graphic interface, the evolution in time of the gradients of each level of the order book, with the positive gradients of buy levels of the order book and the negative gradients of sell levels of the order book being represented in a color representing a price rise signal and its intensity being proportional to the absolute value of the gradient, and the negative-gradients of buy levels of the book and the positive gradients of sell levels of the book being represented in a color representing a price drop signal and its intensity being proportional to the absolute value of the gradient.

The novel method of the present invention furthermore permits calculation of a novel trading profile for each member and for a representation option selected from among all the transactions conducted on the same stock by a member and all the transactions conducted by a member on various stocks. This trading profile is based on calculating a variable known as "odds-rate" (OR) which discloses the operation of the member with respect to the variation in the stock price. For this, the method of the present invention additionally comprises:

calculating:
- a buy limit volume Vlb, which is equal to the sum of transaction volumes conducted by the member by means of buy limit price orders during a determined period;
- a sell limit volume Vls, which is equal to the sum of transaction volumes conducted by the member by means of sell limit price orders during a determined period;
- a buy market volume Vmb, which is equal to the sum of transaction volumes initiated by the member by means of buy market orders during a determined period; and
- a sell market volume Vms, which is equal to the sum of transaction volumes initiated by the member by means of sell market orders during a determined period;

calculating a value known as odds-rate, OR:

$$OR = \frac{Vls * Vmb}{Vlb * Vms}$$

calculating a representation area for each volume where the radius is calculated by means of:

$$R_i = \sqrt{\frac{V_i}{\sum_{k=1}^{4} V_k}}$$

where $V_i$ is an option selected from among Vls, Vmb, Vlb and Vms;

depicting in real time, on a user graphic interface which forms a square divided into four quadrants, the volumes Vlb, Vls, Vmb and Vms, in the upper left, lower left, upper right and lower right squares, respectively, representing a pie, the two buy volumes being represented in the color determinated for buys and the two sell volumes in the color determined for sells; the larger (primary) diagonal of the pie being represented with high intensity of its corresponding color (dark color) and the smaller (secondary) diagonal of the pie being represented with low intensity of its corresponding color (light color); the sum of upper areas of the pie being equal to the lower one if the member buys as much as he sells and the sum of left areas of the pie being equal to the right one if the member contracts with limit orders as much as with market orders; when buy-sell equality holds, the four volumes representing a circle (OR=1) and disclosing an operation by the member that is neutral with respect to the variation in the stock price, an imperfect circle with larger diagonal being the upper right and lower left quadrants which determine an ascending primary diagonal (OR>1) and disclosing an operation by the member who favors a positive variation in the stock price, and an imperfect circle with larger diagonal being the upper left and lower right quadrants which determine a descending primary diagonal (OR<1) and disclosing an operation by the member who favors a negative variation in the stock price;

In order to carry out the novel method of the present invention, said present invention comprises a system of visual representation of stock exchange transactions for at least one registered stock in terms of price levels in a price limit order book. Each transaction is defined by a transaction information associated with that transaction, said transaction information associated with said transaction being stored in a market database which sends said information to some user equipment comprising at least:

- a memory element for storing in real time the transaction information associated with each transaction of each stock;
- a processor which analyzes in real time the transaction information stored in the memory element, it calculates some representation parameters on the basis of the transaction information associated with each transaction and sends those parameters to a graphic processor;
- a graphic processor which analyzes in real time the representation parameters and sends them to a user graphic interface;
- a user graphic interface which produces a graphic representation in real time of the representation parameters; and,
- a database connected to the processor which stores the analysis made by the processor in order to produce an accumulated representation of the data.

Said representation parameters are the limit buy/sell volumes and the buy/sell market volumes, the odds-rate value (OR), the representation radius the normalized volumes and the ratio among the volumes. With all these parameters, a determination is made of the buyer/seller pressure, the market depth, the volume gradients and the trading profile, which help traders to take the best decisions.

BRIEF DESCRIPTION OF THE DRAWINGS

The patent or application file contains at least one drawing executed in color. Copies of this patent or patent application publication with color drawings will be provided by the office upon request and payment of the necessary fee.

DETAILED DESCRIPTION OF A PREFERRED EMBODIMENT

The present invention fills the need to provide basic information when it comes to producing an analysis and a representation of stock exchange transactions. Said basic information is the determination of whether the transaction is initiated by buys or by sells. This basic information can be treated by mean of a binary variable known as "side". The present invention produces a suitable representation of the information associated with each transaction as a function of that variable, with which any user or trader can analyze the variations of stocks and take more accurate decisions.

Figure 1:
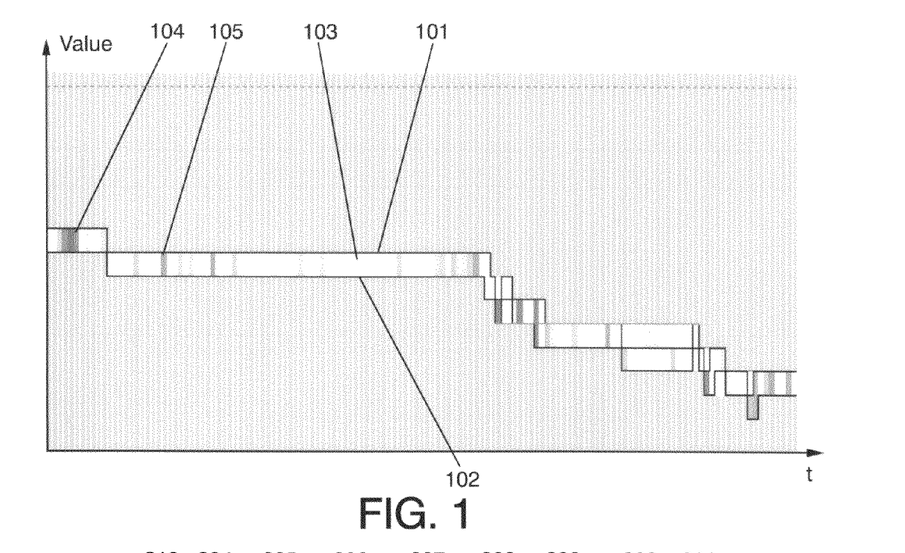
FIG. 1 shows an example of embodiment of the method of representation of the present invention where the sell limit price registered in the first sell level of the order book and the buy limit price registered in the first buy level of the order book are represented on a price-time graph along with the volumes executed.

FIG. 1 shows an example of embodiment of the method of representation of the present invention where the sell limit price registered in the first sell level of the order book and the buy limit price registered in the first buy level of the order book are represented on a price-time graph along with the volumes executed. The sell limit price is represented by the upper black line 101 and the buy limit price is represented by the lower black line 102, with a space remaining between the two lines known as "spread" 103 which is used for representing the executed volumes 104-105. These executed volumes are represented in green 105 when buys beat sells and in red 104 when sells beat buys, the intensity of those colors being proportional to the executed volumes for that time period t. The present invention is capable of determining the representation color which the user or trader will be shown by means of a user graphic interface, starting from the above calculation between buys and sells, thanks to the fact that, for each transaction, it determines the value of a binary variable known as side with takes the value "1" if the transaction is originated by a buy and the value "2" if the transaction is originated by a sell.

FIG. 1 and all the following ones which represent price against time are divided horizontally into time periods (they can be seconds, minutes, etc.), and vertically into price "ticks" (1 tick, 0.01€, 0.01$, etc.). The two staggered black lines are the price of the first sell position (Ask) and of the first buy position (Bid).

The use of the colors red and green does not set a limitation on the present invention for any of the embodiments described here and possible embodiments arising from any of them.

Figure 2:
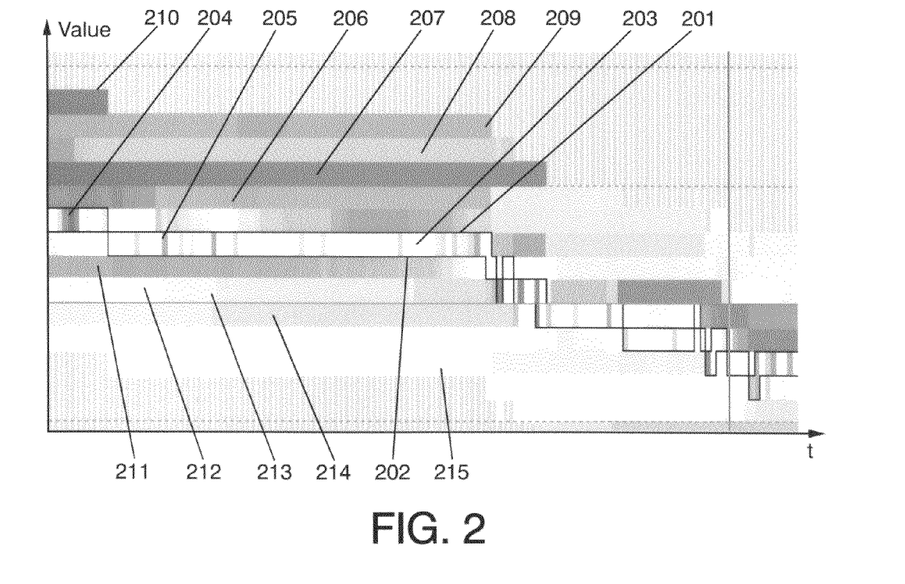
FIG. 2 shows an example of embodiment of the method of representation of the present invention where, in addition to representing the sell limit price registered in the first sell level of the order book and the buy limit price registered in the first buy level of the order book on a price-time graph along with the volumes executed, the limit volumes of the first five sell and buy positions of the order book are also shown.

FIG. 2 shows an example of embodiment of the method of representation of the present invention where, in addition to representing the sell limit price registered in the first sell level 201 of the order book and the buy limit price 202 registered in the first buy level of the order book on a price-time graph along with the volumes executed 204-205 within the representation space between the two lines known as "spread" 203, the volumes of the first five sell positions 206-210 of the order book are shown in red and of those of buys 211-215 of the order book are shown in green. In the same way as with the previous figure, the present invention is capable of determining the representation color which the user or trader will be shown by means of a user graphic interface, starting from the above calculation between buys and sells, thanks to the fact that, for each transaction, it determines the value of a binary variable known as side which takes the value "1" if the transaction is originated by a buy and the value "2" if the transaction is originated by a sell.

Figure 3:
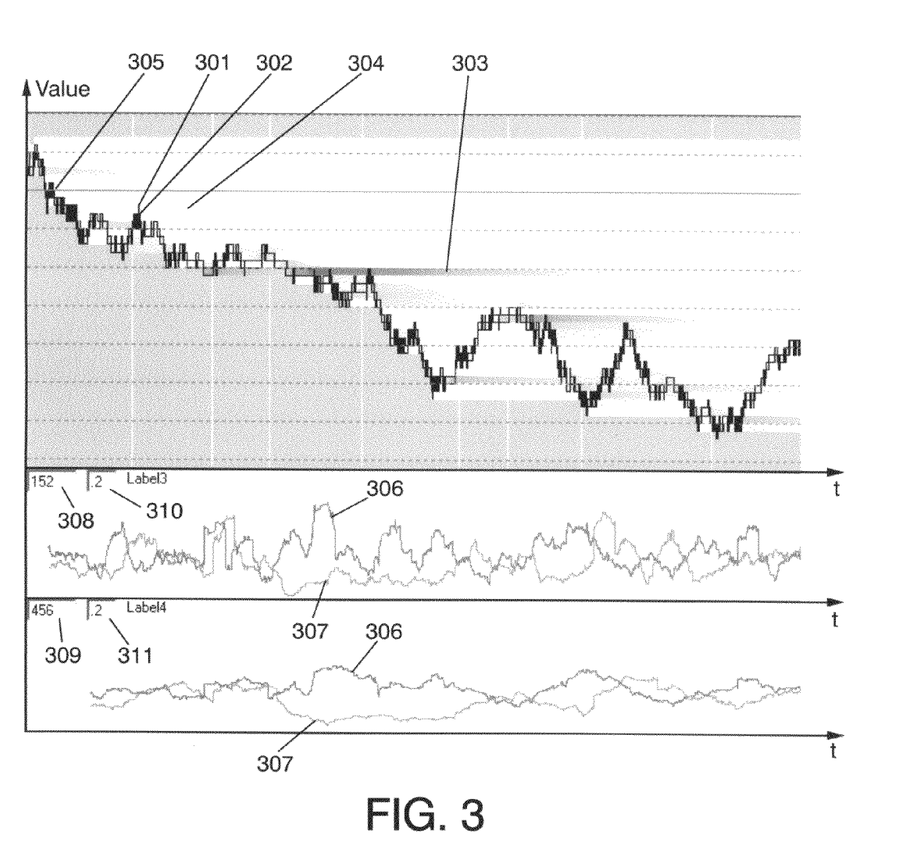
FIG. 3 shows an example of embodiment of the method of representation of the present invention where the real Bid/Ask pressure is represented.

FIG. 3 shows an example of embodiment of the method of representation of the present invention where the by price real Bid/Ask pressure is represented. In order to be able to produce that representation, the present invention calculates for each price level p, in real time, the accumulated real Bid/Ask pressure $PRA_t(p)$ by means of the following expression:

$$PRA_t(p) = \alpha \cdot PRA_{t-1}(p) + VA_t(p) - VB_t(p);$$

where $PRA_{t-1}(p)$ represents the accumulated by price real Bid/Ask pressure in the minimum representation period t−1 and α is a coefficient between 0 and 1 weighting the importance of period t−1 for the calculus of period t;

It is also possible to weight each period with the variation that the price has undergone. In this case, in absolute value since the sign depends on whether the net volume is one of buy (positive) or sell (negative):

$$PRA_t(p) = \alpha \cdot PRA_{t-1}(p) + abs(CLV_t) \times (VA_t(p) - VB_t(p));$$

where $CLV_t$ is the "Close Location Value" known in the state of the art. The relative position of the close with respect to the range formed by the maximum and minimum, in absolute value, takes on a value of between 1 (close=maximum or close=minimum) and 0 (close=0.5*(minimum+maximum)).

Said FIG. 3 shows how, once the accumulated by price real Bid/Ask pressure has been calculated in real time, the evolution of that accumulated by price real Bid/Ask pressure is represented graphically in real time, on the user graphic interface, said pressure being represented at each price level the stock price passes through, with the color green when $PRA_t$ is greater than zero 303, its intensity being proportional to the value of $PRA_t$, and with the color red when $PRA_t$ is less than zero 304, its intensity being proportional to the absolute value of $PRA_t$. In addition, FIG. 3 shows in white 305 values of $PRA_t$ close to zero which denote that the buyer pressure is approximately equal to the seller pressure.

FIG. 3 also shows the evolution in time of the moving averages of the values $VA_t$ 306 and $VB_t$ 307 starting from some weightable values 308-309 (length in number of time periods of the moving window) selected by the user for some time scales 310-311.

Figure 4:
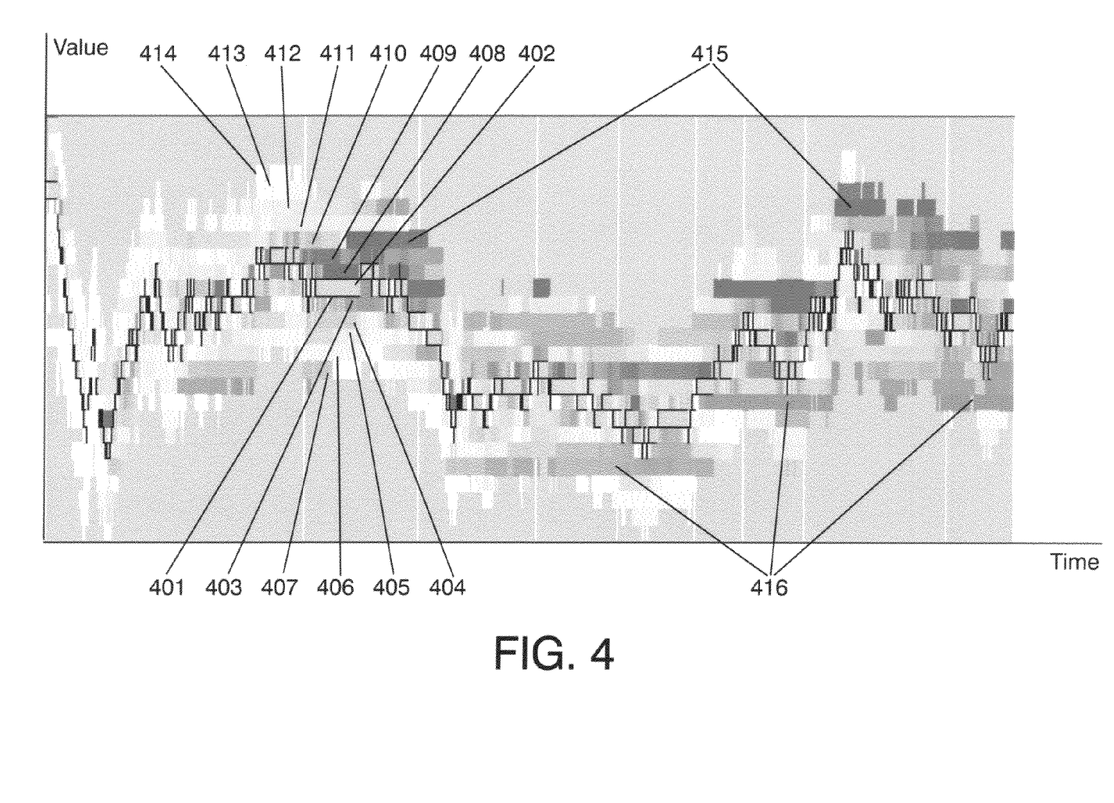
FIG. 4 shows an example of embodiment of the method of representation of the present invention where the evolution in time of the volume of each buy and sell level of the price limit order book is represented.

FIG. 4 shows an example of embodiment of the method of representation of the present invention where the evolution in time of the volume of each buy and sell level of the price limit order book is represented. For an operator to be able to handle the reception of all the information associated with all the transactions (normally by means of graphs) it becomes necessary to process those time variables. Since the volume that is contracted during the day also evolves with time, we normalize the volumes of each position in order to get the information to emerge. We carry out said normalization by means of a reference volume calculated as the total volume of K levels weighted for N time periods. Both the limit volumes of buy levels and the limit volumes of sell levels registered in the order book are normalized by means of the following expression:

$$Vn_t^i = N \cdot \frac{V_t^i}{\sum_{j=0}^{N-1} \sum_{k=1}^{K} V_{t-j}^k};$$

where $V_t^i$ is the limit volume of level i in time period t, "K" is the total number of levels, "N" is the number of time periods passed taken into account for the normalization (preferably several days, e.g. 30 days) and $Vn_t^i$ is the normalized volume of level i in time period t.

Once the normalized volumes have been calculated, FIG. 4 shows the graphic representation in real time, on the user graphic interface, of the evolution in time of those normalized volumes of the order book, the normalized buy volumes 403-407 below the first buy level 401 on the price axis being represented in the color determined for buys and its intensities being proportional to the value of the normalized buy volumes, and the normalized sell volumes 408-414 above the first sell level 402 on the price axis being represented in the color determined for sells and its intensities being proportional to the value of the normalized sell volumes; permitting the "ceilings" 415 and "supports" 416 of the stock to be identified at any instant of the graphic representation. These dark zones facilitate the detection of what is known in stock exchange analysis as "supports" and "ceilings". A zone of intense color in the positions for buy will highlight a possible "support", or zone below which it becomes more difficult for the stock to fall, since there exists an accumulation of positions for the buy. On the other hand, a zone of intense color in the positions for the sell will highlight the price at which a "ceiling" can be found, or zone of prices above which it is more difficult for the stock price to rise since there exists an accumulation of positions of stocks for the sell.

In this way, the relative weight of each position in the book appears clearly, which is key information for stock exchange operators since it provides them with very valuable information on possible price margins within which a stock is going to move in the following periods. In each time instant of the graph, the state of the volume variables is represented in that moment as well as their previous and later evolution, with which, by means of a simple glance, the system allows an assessment to be had of the disposition over the course of the day of the concentration or scattering of the main volumes for buy and for sell and their corresponding prices. The color intensity of each level is proportional to $Vn_t^i$. If the volume at a given price is well below the reference volume, the color degrades towards white, and if it is well above the color becomes dark. Red is used for the sell side of the order book and green for the buy side. As a result, there appear patches of color, thanks to which the prices at which the accumulations of stocks for the buy and for the sell are to be found are detected immediately, simply by observing the most intense color zones. On the other hand, zones of pale colors will be highlighting prices at which there is little volume being offered.

Figure 5:
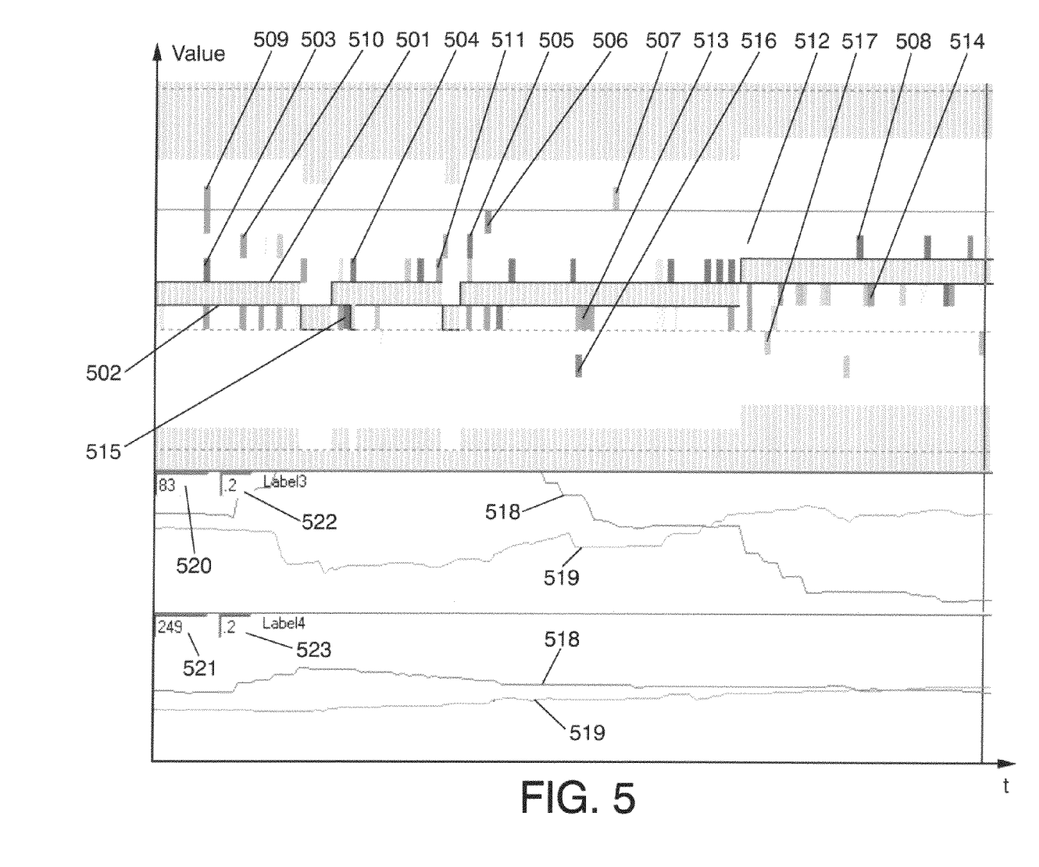
FIG. 5 shows an example of embodiment of the method of representation of the present invention where the evolution in time of the volume gradients is represented.

FIG. 5 shows an example of embodiment of the method of representation of the present invention where the evolution in time of the volume gradients is represented. On the basis of the normalized volumes calculated earlier, the gradients of the volume variables can be calculated from one period to the next. We are informed of the gradient (positive or negative) of the volume in each position i of the book (both for buys and for sells) for any instant t:

$$\nabla V_t^i = V n_t^i - V n_{t-1}^i$$

If $\nabla V_t^i > 0$ for sell levels i represented in red 503-508 and which are to be found above the first sell position 501, they increase the positions for the sell, a bearish signal.
If $\nabla V_t^i < 0$ for sell levels i represented in green 509-512 and which are to be found above the first sell position 501, they decrease the positions for the sell, a bullish signal.
If $\nabla V_t^i > 0$ for buy levels i represented in green 513-514 and which are to be found below the first buy position 502, they increase the positions for the buy, a bullish signal.
If $\nabla V_t^i < 0$ for buy levels i represented in red 515-517 and which are to be found below the first buy position 502, they decrease the positions for the buy, a bearish signal.

Due to representing the first derivative of the volume variables of the order book, it is possible to anticipate situations where the "volume imbalance" is very positive (much greater sell volume) or very negative (much greater buy volume). This "volume imbalance" is a ratio which informs us of the immediate evolution which the price of the share can have. Said ratio is calculated by means of the expression:

$$\text{Ratio} = \log \frac{V_t^{ASK}}{V_t^{BID}}$$

where $V_t^{ASK}$ is the volume of the first sell level of the order book for the period t, and $V_t^{BID}$ is the volume of the first buy level of the order book for the period t.

FIG. 5 also shows the evolution in time of the moving averages of the values $VA_t$ 518 and $VB_t$ 519 starting from some weightable values 520-521 (length in number of time periods of the moving window) selected by the user for some time scales 522-523.

Figure 6:
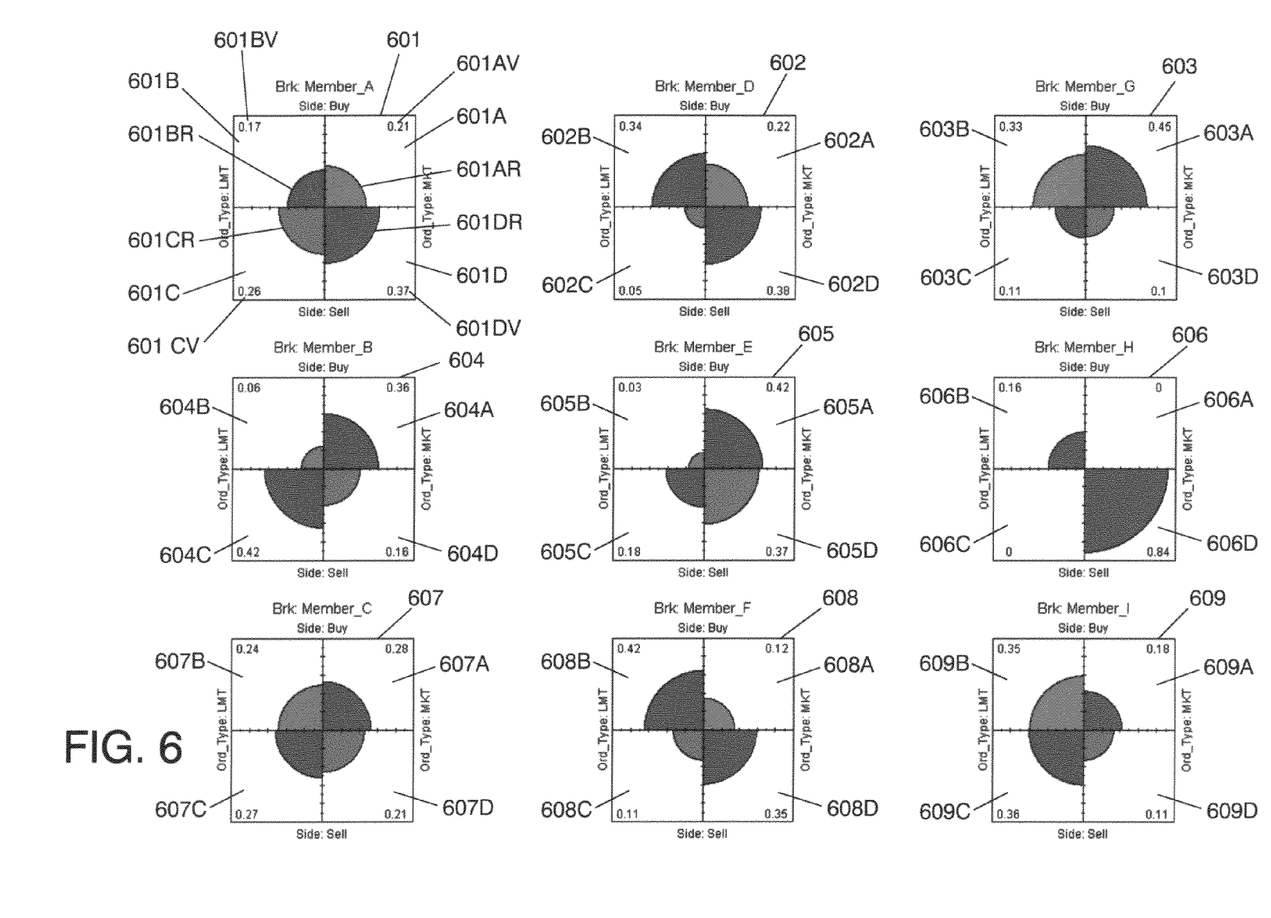
FIG. 6 shows an example of embodiment of the method of representation of the present invention where the trading profile of various operators on a particular stock is represented.

FIG. 6 shows an example of embodiment of the method of representation of the present invention where the trading profile of various operators on a particular stock is represented. It is only possible to produce this trading profile of various operators when the code of the member carrying out each operation is an accessible piece of information. This permits an individualized analysis to be conducted for each member and for each stock he is negotiating. In any case, a single operator can carry out this analysis for his own execution orders.

As has been mentioned above, the transactions are the consequence of orders that are placed on the market and then executed. These orders can be of two types: limit price orders and market orders. For the first, it is known whether they are buys or sells depending on which half of the order book (buys or sells) they are located in. For the second, their side variable can also be known: whether they attacked sell orders (buy) or they attacked buys (sell). The combination of these two dichotomous variables (buy/sell and order type) leads to four possibilities (limit price buy, market buy, limit price sell, market sell) which can be represented as a contingency table. Indeed, for each member and negotiated security, it is possible to account for the total sum volume of the orders (in number of securities) for each one of the four categories such that:

The buy limit volume Vlb is equal to the sum of volumes of transactions conducted by the member by means of buy limit price orders during a particular period.

The sell limit volume Vls is equal to the sum of volumes of transactions conducted by the member by means of sell limit price orders during a particular period.

The buy market volume Vmb is equal to the sum of volumes of transactions initiated by the member by means of buy market orders during a particular period.

The sell market volume Vms is equal to the sum of volumes of transactions initiated by the member by means of sell market orders during a particular period.

Said FIG. 6 represents for 9 stock exchange members in separate sub-graphs 601-609, the distribution of volume placed (Vlb, Vls, Vmb, Vms) on the market for the four categories in a particular period of time. Each sub-graph 601-609 for a member is divided into four quadrants such that the upper left quadrant represents the buy limit volume Vlb 601B-609B, the lower left quadrant represents the sell limit volume Vls 601C-609C, the upper right quadrant represents the buy market volume Vmb 601A-609A and the lower right quadrant represents the sell market volume Vms 601D-609D.

The area of each portion is proportional to the ratio between the volume of its category and the total sum volume of the four categories. So that this can occur, the radius of each portion 601AR-609AR, 601BR-609BR, 601CR-609CR, 601DR-609DR has to satisfy:

$$R_i \propto \sqrt{\frac{V_i}{\sum_{k=1}^{4} V_k}},$$

where the subindex indicates each one of the four categories (buy limit order lb, sell limit order ls, buy market order mb, sell market order ms). The number appearing in each quadrant is the normalized volume $$V_i \Big/ \sum_{k=1}^{4} V_k$$

601AV-609AV, 601BV-609BV, 601CV-609CV, 601DV-609DV of each category.

The main information provided by the sub-graphs 601-609 is related to the style of trading which each member carries out for a particular stock, even revealing the intentions of a member or at least the direct consequences which his orders have on the variation in the stock price.

First, a comparison between buys and sells can be made. If the sum of upper areas (Vlb+Vmb) is noticeably bigger or smaller than the sum of lower areas (Vls+Vms) that's because the member had a high volume buy or sell order to make. Sub-graphs 601 and 603 are respectively the examples.

As the buy area become equal to the sell area, other analyses arise because we can evaluate the member's trading for almost the same volume bought and sold in the period depicted by the graph. After the period, his position in the market approaches zero. Thus, without considering the random variation in the stock price (which constitute a benefit or a loss 50% of the time), if the sum of left areas is noticeably bigger than the sum of right areas, the member is winning money with his trading in the period because he is contracting more volume with limit orders than with market orders. In other words, the member is saving the spread more often than losing it. Example of that is FIG. 609. If it is the contrary, the member is losing money with his trading in the period because he is contracting more volume with market orders than with limit orders, i.e. he is losing the spread more often than saving it (FIG. 605).

In order to be able to make a proper assessment of the information provided by each sub-graph 601-609 and its relation with the stock price variation, the odds-ratio (advantage ratio) is defined as:

$$OR = \frac{Vls * Vmb}{Vlb * Vms}$$

The volumes Vls and Vmb "pull" the stock towards higher prices: sells limited in price; buys not limited in price.

The volumes Vlb and Vms "pull" the stock towards lower prices: sells not limited in price; buys limited in price.

Therefore, an OR=1, graphically represented by a circle like that shown in sub-graph 607, corresponds to a distribution of volume in types of order that is neutral with respect to the variation in price. An OR>1, graphically represented by the ascending main diagonal (dark color), sub-graph 604, corresponds to a distribution which pushes the price upwards. An OR<1, graphically represented by the descending main diagonal (light color), sub-graphs 602, 606, and 608, as clear examples, corresponds to a distribution which pushes the price downwards. The odds-ratio relates the probability of sell limit orders being given together with buy market orders against the probability of buy limit orders being given with sell market orders. When one of these probabilities is clearly greater than the other, the graph shows intuitively, via the main diagonal, what consequences the orders of that member have on the evolution of the market. Bearing in mind the weight implied by the volume of each member with respect to the total for the stock, the graphs can be combined in such a way as to obtain a single graph per stock showing us the price tendency at which it stands.

Figure 7:
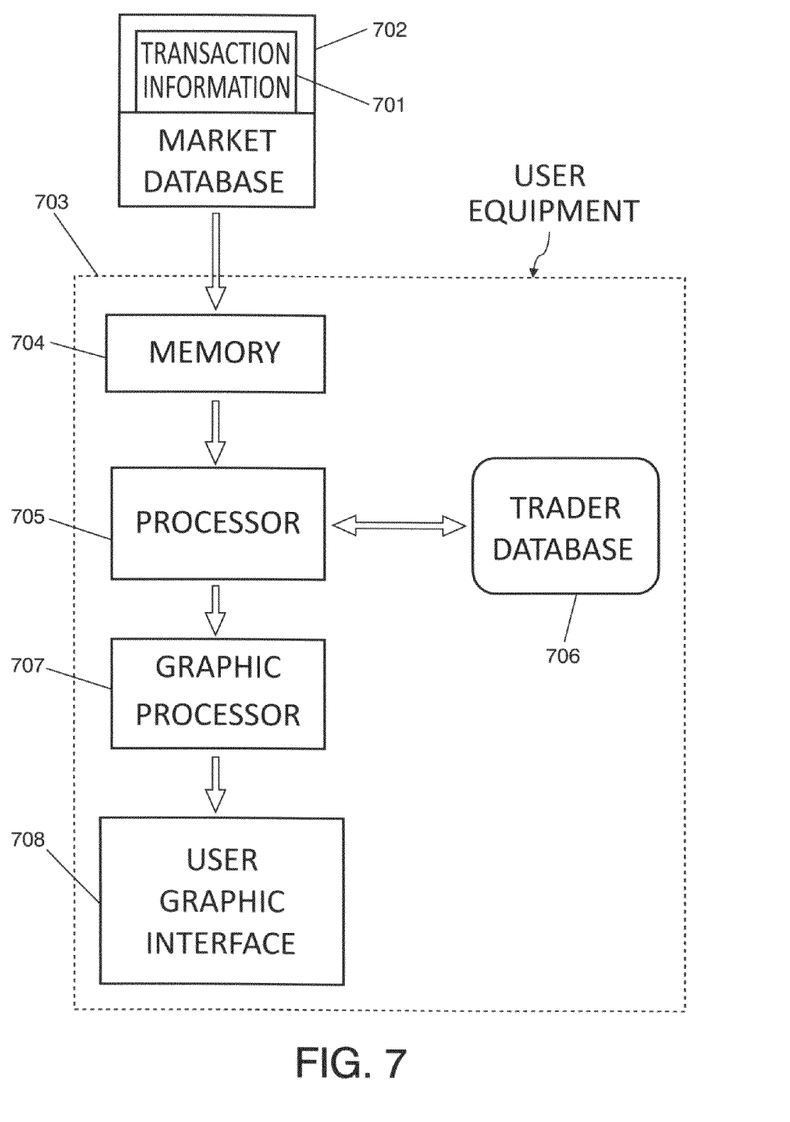
FIG. 7 shows a block diagram of the system of visual representation of stock exchange transactions of the present invention.

FIG. 7 shows a block diagram of the system of visual representation of stock exchange transactions of the present invention. The system comprises transaction information 701 associated with each transaction which is stored in a market database 702 which sends that information to some user equipment 703 comprising at least:

- a memory element 704 for storing in real time the transaction information 701 associated with each transaction of each stock;
- a processor 705 which analyzes in real time the transaction information stored in the memory element 704, it calculates some representation parameters on the basis of the transaction information 701 associated with each transaction and sends those parameters to a graphic processor 707;
- a graphic processor 707 which analyzes in real time the representation parameters and sends them to a user graphic interface 708;
- a user graphic interface 708 which produces a graphic representation in real time of the representation parameters; and,
- a database 706 connected to the processor which stores the analysis made by the processor in order to produce an accumulated representation of the data.

Figure 8:
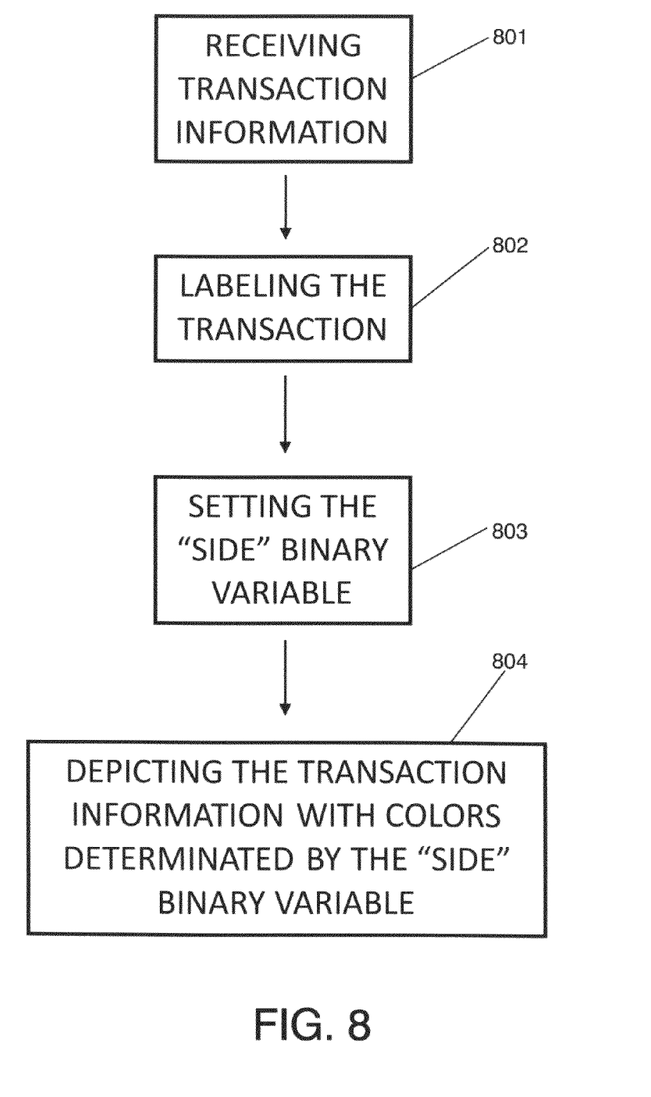
FIG. 8 shows a flow chart of the method of visual representation of stock exchange transactions of the present invention.

FIG. 8 shows a flow chart of the method of visual representation of stock exchange transactions of the present invention. Said states diagram comprises four basic steps 801-804 for carrying out the method of the present invention. These steps are:

receiving 801 in real time at least one transaction and its associated transaction information;

labeling 802 the at least one transaction with a label selected from between initiated buy transaction, when the execution price is equal to or greater than the sell limit price registered in the first sell level of the order book, and initiated sell transaction, when the execution price is equal to or lower than the buy limit price registered in the first buy level of the order book;

determining 803 the value in real time of a binary variable known as "side" which takes the value "1" when the transaction information is an initiated buy transaction and takes the value "2" when the transaction information is an initiated sell transaction; and depicting in real time 804, on a user graphic interface, the transaction information selected between the initiated sell transaction information, the initiated buy transaction information and a combination of both by means of at least two colors determined by the "side" binary variable.

The invention claimed is:

1. A method of visual representation of stock exchange transactions for at least one registered stock in terms of price levels in a price limit order book, where each transaction is defined by transaction information associated with the transaction, the transaction information including at least:
   a date and time;
   a negotiation market;
   a negotiated stock;
   an execution volume;
   a sell limit price registered in a first sell level of the order book;
   a buy limit price registered in a first buy level of the order book; and
   an execution price,
   the method for each stock exchange transaction comprising:
   receiving in real time, using a user equipment processor, at least one transaction and its associated transaction information;
   labeling, using the user equipment processor, the at least one transaction with a label selected from between an initiated buy transaction, when the execution price is equal to or greater than the sell limit price registered in the first sell level of the order book, and an initiated sell transaction, when the execution price is equal to or lower than the buy limit price registered in the first buy level of the order book;
   determining, using the user equipment processor, a value in real time of a binary variable known as "side" which takes a value "1" when the transaction information is an initiated buy transaction and takes a value "2" when the transaction information is an initiated sell transaction;
   depicting in real time, using a user equipment graphic processor and on a user graphic interface, the transaction information selected between the initiated sell transaction information, the initiated buy transaction information and a combination of both by means of at least two colors determined by the "side" binary variable;
   adding a color for depicting in real time, on the user graphic interface, an evolution in time of the buy limit price in the first buy level and of the sell limit price in the first sell level; and
   calculating for each minimum representation time period "t", a buy volume executed against sell orders of a book (ASK), $VA_t$, whose value corresponds to a sum of the executed volumes of initiated buy transactions whose date and time lie within a minimum representation time period "t", and an executed sell volume against buy orders of a book (BID), $VB_t$, whose value corresponds to a sum of the executed volumes of initiated sell transactions whose date and time lie within the minimum representation time period "t".

2. The method of claim 1, further comprising:
calculating a real Bid/Ask pressure for a minimum representation time "t":

$$PR_t = VA_t - VB_t;$$

depicting in real time, on the use graphic interface, an evolution in time of the real Bid/Ask pressure, the pressure being represented between a representation made for the time evolution of the buy limit price in the first buy level and the sell limit price in the first sell level, with a color determined by the value "1" of a side variable if $PR_t$ is greater than zero and its intensity being proportional to an absolute value of $PR_t$, and by the value "2" of the side variable if $PR_t$ is less than zero and its intensity being proportional to the absolute value of $PR_t$; and adding a color when a value of $PR_t$ is equal to zero.

3. The method of claim 1, further comprising:
depicting in real time, on that user graphic interface, an evolution in time of a volume of each buy and sell level of the price limit order book, buy volumes below the first buy level in a price axis being represented in a color determined for buys, and sell volumes above the first sell level in the price axis being represented in a color determined for sells.

4. The method of claim 2, further comprising:
depicting in real time, on that user graphic interface, the evolution in time of the volume of each buy and sell level of the price limit order book, the buy volumes below the first buy level in the price axis being represented in the color determined for buys, and the sell volumes above the first sell level in the price axis being represented in the color determined for sells.

5. The method of claim 1, further comprising:
calculating, in real time, an accumulated by price real Bid/Ask pressure $PRA_t$:

$$PRA_t(p) = \alpha \cdot PRA_{t-1}(p) + VA_t(p) - VB_t(p);$$

where $PRA_{t-1}$ represents the accumulated real Bid/Ask pressure in a minimum representation period t−1 and a is a coefficient between 0 and 1 weighting an importance of period t−1 for a calculus of period t;
depicting in real time, on the use graphic interface, the evolution in time of the accumulated by price real Bid/Ask pressure, the pressure being represented at each price level a stock price passes through, with a color determined for buys if $PRA_t$ is greater than zero, its intensity being proportional to an absolute value of $PRA_t$, and with a color determined for sells if $PRA_t$ is less than zero, its intensity being proportional to the absolute value of $PRA_t$; adding a color when a value of $PRA_t$ is equal to zero.

6. The method of claim 5, further comprising:
depicting in real time, on the user graphic interface, an evolution in time of some moving averages of values $VA_t$ y $VB_t$ on a basis of some weightable values, length in number of time periods of a moving window, selected by a user;
calculating a volume imbalance between the first sell level of an order book (ASK) and the first buy level of the order book in order to determine an immediate evolution in the stock price by means of a ratio:

$$\text{Ratio} = \log \frac{V_t^{ASK}}{V_t^{BID}}$$

where $V_t^{ASK}$ is a volume of the first sell level for a period t, and $V_t^{BID}$ is a volume of a first buy level for a period t.

7. The method of claim 1, further comprising:
normalizing a volume of each registered level in the order book by means of:

$$Vn_t^i = N \cdot \frac{V_t^i}{\sum_{j=0}^{N-1} \sum_{k=1}^{K} V_{t-j}^i};$$

where $V_t^i$ is a volume of level i in a time period t, "K" is a total number of levels, "N" is a number of time periods passed taken into account for a normalization, $Vn_t^i$ is a normalized volume of level i in a time period t;
depicting in real time, on the user graphic interface, an evolution in time of normalized volumes of the order book, with normalized buy volumes below the first buy level on a price axis being represented in a color determined for buys and its intensities being proportional to a value of the normalized buy volumes, and normalized sell volumes above the first sell level on the price axis being represented in a color determined for sells and its intensities being proportional to a value of the normalized sell volumes; permitting "ceilings" and "supports" of the stock to be identified at any instant of representation up to the time period t.

8. The method of claim 7, further comprising:
calculating a gradient for each normalized volume of the price limit order book by means of:

$$\nabla V_t^i = Vn_t^i - Vn_{t-1}^i;$$

where $\nabla V_t^i$ is a gradient of level i for a period t, and $Vn_t^i$ and $Vn_{t-1}^i$ represent a normalized volume of level i for a time period t and t−1 respectively;
depicting in real time, on the user graphic interface, an evolution in time of gradients of each level of the order book, with positive gradients of buy levels of the order book and negative gradients of sell levels of the order book being represented in a color representing a price rise signal and its intensity being proportional to an absolute value of the gradient, and the negative gradients of buy levels of the book and the positive gradients of sell levels of the book being represented in a color representing a price drop signal and its intensity being proportional to an absolute value of the gradient.

9. The method of claim 1, wherein transaction information includes two codes of two members carrying out a transaction, and wherein the method further comprises:
calculating:
a buy limit volume Vlb, which is equal to a sum of transaction volumes conducted by a member by means of buy limit price orders during a determined period;
a sell limit volume Vls, which is equal to a sum of transaction volumes conducted by the member by means of sell limit price orders during a determined period;
a buy market volume Vmb, which is equal to a sum of transaction volumes initiated by the member by means of buy market orders during a determined period; and
a sell market volume Vms, which is equal to a sum of transaction volumes initiated by the member by means of sell market orders during a determined period;
for each member and for a representation option selected from among all transactions conducted on a same stock by a member and all a transactions conducted by a member on various stocks;
calculating a value known as odds-rate, OR:

$$OR = \frac{Vls * Vmb}{Vlb * Vms}$$

calculating a representation area for each volume where a radius is calculated by means of:

$$R_i = \sqrt{\frac{V_i}{\sum_{k=1}^{4} V_k}}$$

where $V_i$ is an option selected from among Vls, Vmb, Vlb and Vms;
depicting in real time, on a user graphic interface which forms a square divided into four quadrants, volumes Vlb, Vls, Vmb and Vms, in upper left, lower left, upper right and lower right squares, respectively, representing a pie, two buy volumes being represented in a color determined for buys and two sell volumes in the color determined for sells; a larger "primary" diagonal of the pie being represented in a dark color and a smaller "secondary" diagonal of the pie being represented in a light color; a sum of upper areas of the pie being equal to a lower one if a member buys as much as the member sells and a sum of left areas of the pie being equal to a right one if the member contracts with limit orders as much as with market orders; when buy-sell equality holds, four volumes representing a circle, OR=1, and disclosing an operation by the member that is neutral with respect to a variation in the stock price, an imperfect circle with larger diagonal being upper right and lower left quadrants which determine an ascending primary diagonal, OR>1, and disclosing an operation by the member who favors a positive variation in a stock price, and an imperfect circle with larger diagonal being upper left and lower right quadrants which determine a descending primary diagonal, OR<1, and disclosing an operation by the member who favors a negative variation in the stock price.

* * * * *